Figure 1:
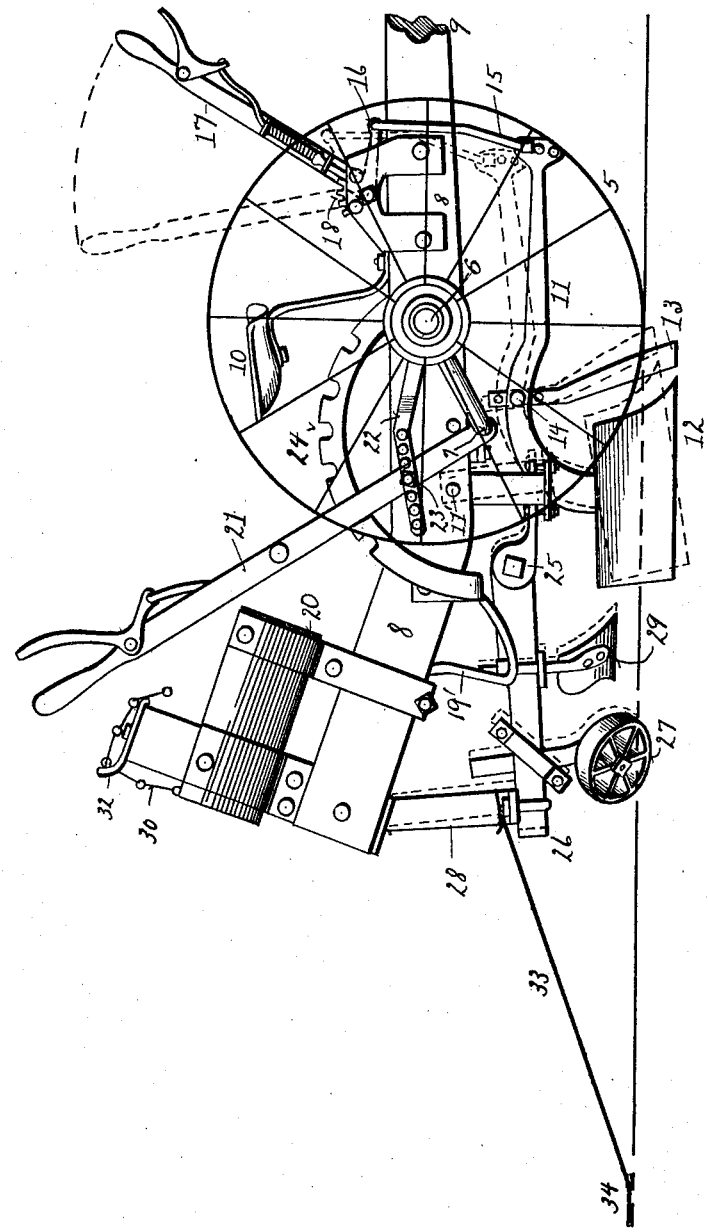

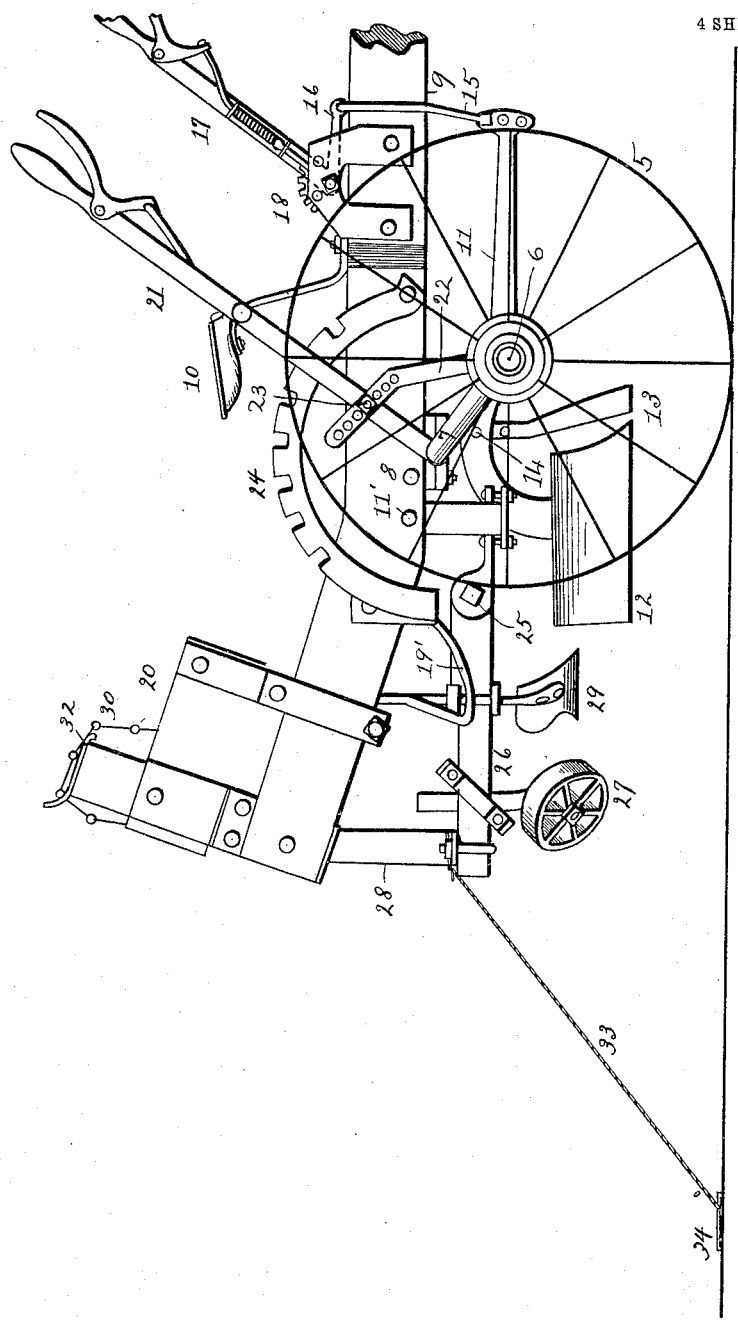

UNITED STATES PATENT OFFICE.

JAMES E. RODMAN, OF TOPEKA, KANSAS.

TREE-PLANTING MACHINE.

1,007,735.     Specification of Letters Patent.     Patented Nov. 7, 1911.

Application filed November 30, 1910. Serial No. 594,883.

*To all whom it may concern:*

Be it known that I, JAMES E. RODMAN, a citizen of the United States, and a resident of the city of Topeka, in the county of Shawnee and State of Kansas, have invented a new and useful Improvement in Tree-Planting Machines, of which the following is a specification.

My invention is an arrangement of a two-faced plow for digging a trench, a suitable receptacle for holding a large number of trees to be planted, a seat for an attendant above the plow, all the foregoing being mounted on wheels, and a following pair of oppositely disposed packing wheels mounted in a frame hinged so as to be movable in a vertical plane, to the forward frame, and adapted to fill and pack the trench, the seat being so arranged that the attendant may place the trees, one at a time, in the trench and hold them there while the following wheels fill in the dirt in the trench and pack it firmly therein and around the tree; it being understood that this operation takes place for one tree after another as the planting machine is drawn across the field by suitable power, as by horses.

My invention has to do in particular with the mounting of the plow so it can be made to have a greater or less dip; also with the mounting of the parts on the main wheels so that the plow and packing wheels may be lifted clear of the ground, as when hauling the machine across country; also with the hinging of the packing wheels to the main frame so that they may be lifted up clear of the ground as when turning corners; also with the special arrangement of the attendant's seat with special relation to the plow, the receptacles, and the packing wheels. And my invention consists of the parts, improvements, and combinations herein set forth and claimed.

In the drawings accompanying and forming part of this specification, and in the description of the drawings, I have shown my invention in its preferred form, and have shown what I deem to be the best mode of applying the principles thereof, but it is to be understood that I contemplate changes in form, proportions, and materials, the transposition of parts, and the substitution of equivalent members, without departing from the spirit of my invention.

Figure 2:
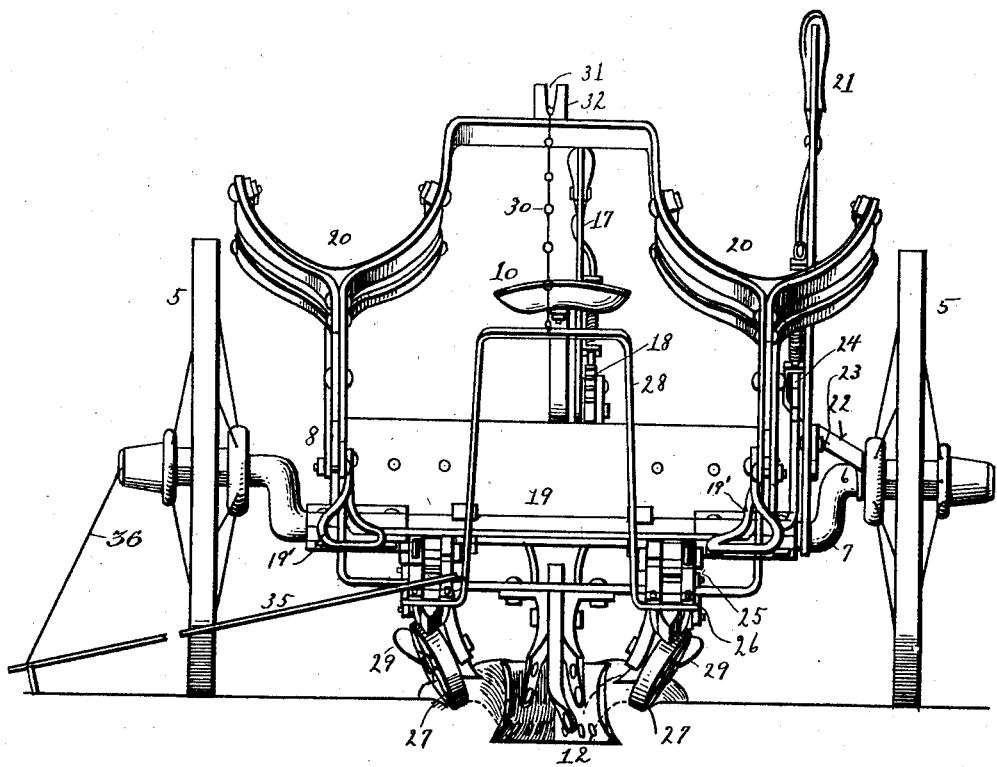
Figure 3:
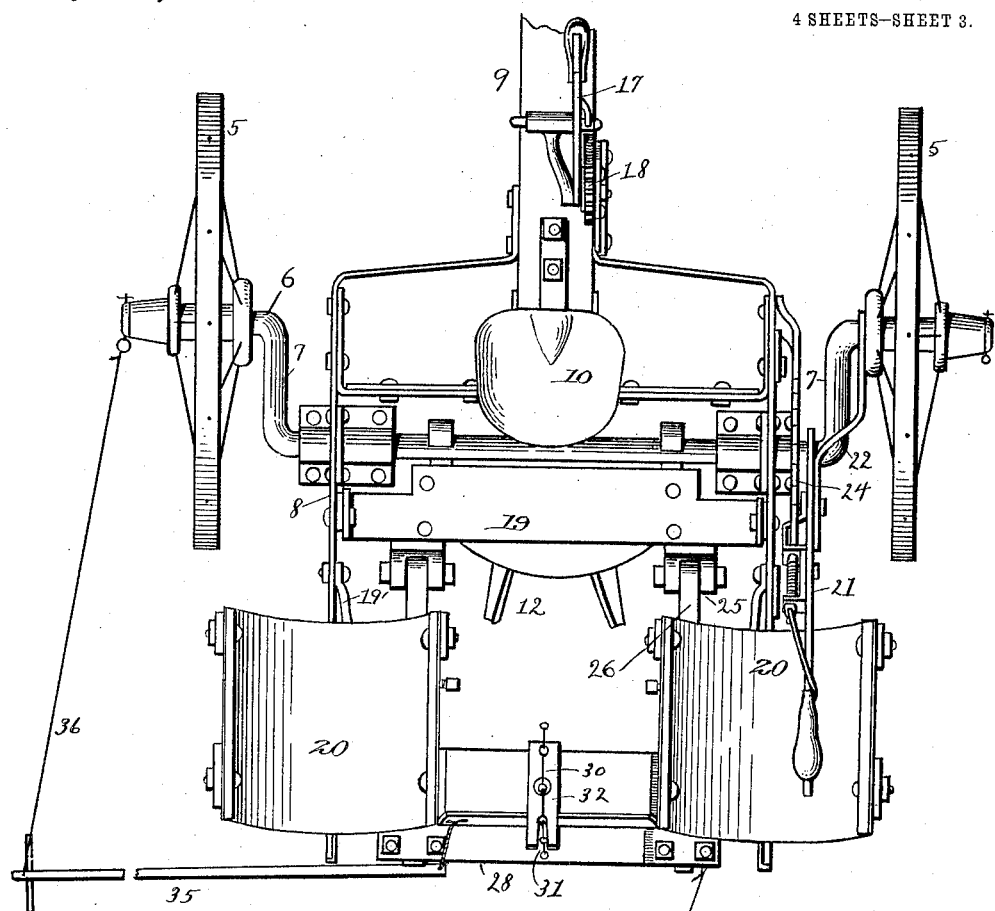

Figure 1 is a side elevation of a planting machine made in accordance with the principles of my invention, the parts being in their respective positions as when in actual use for planting; with a dotted outline showing how the dip of the plow may be changed by shifting the handle on the rack. Fig. 2 is a rear elevation. Fig. 3 is a plan view. And Fig. 4 is a side elevation corresponding with Fig. 1, but with the parts lifted to clear the ground as when hauling the machine from place to place without planting. The tongue is broken away in Figs. 1, 3, and 4, and the marker is shown as partly broken away in Figs. 2 and 3.

Similar reference characters indicate like or corresponding parts throughout the several views.

The main or forward truck comprises the two large wheels 5, 5, the axle 6, having its middle portion offset as shown at 7, and the frame 8 mounted on the offset middle portion, the same being provided with a tongue 9, and draft appliances not necessary to be here shown.

10 is the driver's seat conveniently located.

11 is a plow-beam pivoted to the under side of the frame at 11' and carrying a two-faced plow 12 capable of digging a suitable trench.

13 is a cutter in advance of the plow and adjustably secured to the plow-beam at 14.

15 is a rod connecting the forward end of the plow-beam with the arm 16 of the handle 17 which engages in the usual manner with the rack 18. By shifting the handle on the rack, it will be obvious that the dip of the plow-beam and plow will be changed. This feature is desirable initially to start the plow into the ground, also to tilt it upward to pull it out of the ground, as well as to regulate the dip while plowing or digging the trench.

19 is an attendant's seat mounted on the frame just above the plow and facing backward, and 19', 19' are stirrups secured to the frame for supporting the attendant's feet.

20, 20 are suitable receptacles or holders for quite a large quantity of the trees to be planted, one receptacle at each side of the attendant's seat, and supported on the main frame.

21 is a lever secured to the offset portion of the axle, and held rigid with relation thereto by means of a brace 22, which connects the axle adjacent the spindle with said lever at 23, and the lever is provided with a handle and a rack 24 which it engages in the usual manner.

In the position shown in Fig. 1 the plow is adapted to dig into the soil over which the machine passes; by shifting the lever forward, the frame with the plow is lifted up clear of the ground, as in Fig. 4. By changing the connection at 23, the throw may be made greater or less toward the front or rear, respectively; that is, the extreme throw may be made to let the plow down lower into the ground, or to lift it higher up, as the case may be. Hinged to the main frame at 25, so as to be movable vertically is a trailing frame 26, to which are secured two packing wheels 27, 27, one on each side of the center line extended of the plow, each wheel being inclined at an angle outwardly both from the bottom up and from the rear forward. This rear frame is supported mainly on said wheels, and the frame comprises an arch portion 28 spanning the middle line, and high enough to clear the tops of the trees that are to be planted with the machine.

29, 29 are plows arranged in advance of the packing wheels to throw the soil back into the trench; but in actual practice these may be used or omitted, as by arranging the packing wheels at the double angles described, they serve to push the earth back into the trench as well as to pack it firmly therein.

30 is a chain, one end of which is secured to the arch, and 32 is a clip or plate having a slot 31 in which the links of the chain may engage, the purpose of the chain being to lift the rear frame with the packing wheels clear of the ground, as when turning a corner.

The operation of the machine is simple. The attendant, seated on his seat, and riding backward, takes the trees, one at a time, from the receptacles, and places them with the roots in the trench, holding them until the packing wheels have passed them packing the earth firmly about the roots. The arch permits him to reach back and hold onto the tree as the machine is drawn along. The arch also serves to hold the packing wheels properly spaced apart and gives rigidity to the rear frame, and at the same time clears the tops of the planted trees.

I find my machine to be superior to the so-called automatic planters in which the plants are placed in the ground by the machine itself, as it is easier for the attendant to place the trees in the ground than it would be for him to place them in the clamps or other individual gripping devices in a machine. To space the trees in the row regularly apart, I use a simple device, namely, a cord 33 secured to the rear of the frame and having any suitable weight 34 attached to its end which drags on the ground, and the attendant sticks a tree in the trench whenever the weight is at one of the trees just planted. Also I provide a marker to mark a parallel next row comprising a rod 35 projecting from the rear of the frame and held in place by a cord 36 secured to the forward part of the machine.

What I claim is:

1. In a tree-planting machine, the combination of a forward truck, a two-faced plow mounted thereon, an attendant's seat above the plow, a receptacle for holding a quantity of trees mounted on said truck, a frame arranged behind the truck and hinged thereto so as to be movable in a vertical plane, and two packing wheels secured to said frame on opposite sides of the center line of the plow extended, each wheel being inclined at angles outwardly from the bottom up and from the rear forwardly.

2. In a tree-planting machine, the combination of a forward truck, a two-faced plow mounted thereon, an attendant's seat on the truck above the plow, a receptacle for holding a quantity of trees mounted on the truck, a frame arranged behind the truck and hinged thereto so as to be movable on said hinges in a vertical plane, said frame having an arch over the center line extended of the plow, and two packing wheels secured to said frame on opposite sides of said center line extended, each wheel being inclined at angles outwardly from the bottom up and from the rear forwardly.

3. In a tree-planting machine, the combination of a forward truck, a two-faced plow mounted thereon, an attendant's seat on the truck above the plow, a receptacle mounted on the truck at each side of the seat, a frame arranged behind the plow and hinged to the truck so as to oscillate vertically, two packing wheels secured to the frame on opposite sides of the center line extended of the plow, and a means for shifting the dip of the plow.

4. In a tree-planting machine, the combination of a forward truck, a two-faced plow mounted thereon, an attendant's seat mounted on the truck above the plow, a tree-holding receptacle mounted on the truck adjacent the seat, a frame hinged to the truck so as to oscillate vertically and arranged behind the plow, two packing wheels secured to said frame, one on each side of the center line of the plow extended, each being inclined at an angle outwardly from the bottom up and from the rear forwardly, and a means for suspending said frame on the truck with the wheels clear of the ground.

In testimony whereof I have signed my name to this specification in the presence of witnesses.

JAMES E. RODMAN.

Witnesses:
C. J. ROSEN,
J. M. STARK.

Copies of this patent may be obtained for five cents each, by addressing the "Commissioner of Patents, Washington, D. C."